United States Patent
Chay et al.

(10) Patent No.: US 11,181,234 B2
(45) Date of Patent: Nov. 23, 2021

(54) BULK METALLIC GLASS PRESSURE VESSELS

(71) Applicant: Supercool Metals LLC, New Haven, CT (US)

(72) Inventors: John Chay, Hamden, CT (US); Jan Schroers, Guilford, CT (US); Jason Sagaci, Stratford, CT (US); Jittisa Ketkaew, North Branford, CT (US); Evgenia Pekarskaya, New York, NY (US)

(73) Assignee: SUPERCOOL METALS LLC, New Haven, CT (US)

( * ) Notice: Subject to any disclaimer, the term of this patent is extended or adjusted under 35 U.S.C. 154(b) by 50 days.

(21) Appl. No.: 16/825,461

(22) Filed: Mar. 20, 2020

(65) Prior Publication Data

US 2020/0300413 A1 Sep. 24, 2020

Related U.S. Application Data

(60) Provisional application No. 62/919,675, filed on Mar. 22, 2019.

(51) Int. Cl.
*F17C 1/04* (2006.01)
*B21D 51/24* (2006.01)

(52) U.S. Cl.
CPC .............. *F17C 1/04* (2013.01); *B21D 51/24* (2013.01); *F17C 2201/0109* (2013.01); *F17C 2203/0604* (2013.01); *F17C 2203/0621* (2013.01); *F17C 2203/0648* (2013.01); *F17C 2209/232* (2013.01)

(58) Field of Classification Search
CPC ... F17C 1/04; F17C 1/02; B21D 51/24; C03C 25/46

USPC ....... 220/581, 586, 62.15, 588, 589; 65/445, 65/444, 374.12, 374.1
See application file for complete search history.

(56) References Cited

U.S. PATENT DOCUMENTS

| | | | | |
|---|---|---|---|---|
| 1,343,191 | A * | 6/1920 | Allcutt | B29D 99/0028 264/570 |
| 3,140,006 | A | 7/1964 | Nelson | |
| 3,268,103 | A * | 8/1966 | Nelson | F17C 1/10 220/586 |
| 3,319,420 | A | 5/1967 | Mercier | |
| 3,497,101 | A * | 2/1970 | Ono | F16J 12/00 220/586 |

(Continued)

FOREIGN PATENT DOCUMENTS

EP 2597166 A1 * 5/2013 ............. C22C 16/00

OTHER PUBLICATIONS

Schroers, Jan. "Bulk Metallic Glasses". Physics Today, vol. 66 Issue 2, Feb. 2013, pp. 2-3. (Year: 2013).*

(Continued)

*Primary Examiner* — Robert J Hicks
(74) *Attorney, Agent, or Firm* — STIP Law Group, LLC

(57) ABSTRACT

A pressure vessel containing a main body with at least one opening. The pressure vessel is made from a BMG material. The pressure vessel may contain an additional part such as a neck, a liner, a rib, a lattice, a fin, and a diaphragm. The pressure vessel may be free of a welded joint in entirety. The pressure vessel may contain multiple parts in the main body, each of which is free of a welded joint. The pressure vessel may be made through thermoplastic forming.

36 Claims, 8 Drawing Sheets

(56) References Cited

U.S. PATENT DOCUMENTS

| | | | |
|---|---|---|---|
| 5,568,878 A * | 10/1996 | LeBreton | B29C 70/86 220/581 |
| 6,401,963 B1 | 6/2002 | Seal et al. | |
| 6,708,502 B1 | 3/2004 | Aceves et al. | |
| 6,709,536 B1 * | 3/2004 | Kim | C22C 1/002 148/403 |
| 2016/0045953 A1 * | 2/2016 | Park | C22C 45/10 428/544 |

OTHER PUBLICATIONS

Somnath Chattopadhyay, Pressure Vessels Design and Practice, 2004, pp. 10-11, 24-25, CRC Press, Boca Raton, USA.

Wen Chen et al, Does the fracture toughness of bulk metallic glasses scatter? Scripta Materialia, 2015, pp. 1-4, vol. 107, Elsevier, Amsterdam, Netherlands.

W.Edward Clayton and Michael L. Griffin, Catastrophic Failure of a Liquid Carbon Dioxide Storage Vessel, Process Safety Progress, Oct. 1994, pp. 202-209, vol. 13, No. 4, AIChE, New York, USA.

Donald M. Fryer et al, High Pressure Vessels, 1998, pp. 1-10, , Springer, Boston, USA.

Jittisa Kethaew et al, Critical Crystallization for Embrittlement in Metallic Glasses, Physical Review Letters, 2015, pp. 265502.1-265502.6, vol. 115, American Physical Society, College Park, USA.

Jittisa Kethaew et al, Mechanical glass transition revealed by the fracture toughness of metallic glasses, Nature Communications, 2018, pp. 1-7, vol. 9, Springer Nature, London, United Kingdom.

H.E. Otto and R. Wittman, Evaluation of NASA-Langley Research Center Explosion Seam Welding, National Aeronautics and Space Administration, 1977, pp. 1-21, The National Technical Information Service, Springfield, USA.

J. Schroers et al, Transition From Nucleation Controlled to Growth Controlled Crystallization in Pd43Ni10Cu27P20 Melts, Acta Materialia, 2001, pp. 2773-2781, vol. 49, Pergamon, Oxford, United Kingdom.

Jan Schroers, Processing of Bulk Metallic Glass, Materials Views, 2010, pp. 1566-1597, vol. 22, Wiley-VCH Verlag GmbH & Co. KGaA, Weinheim, Germany.

* cited by examiner

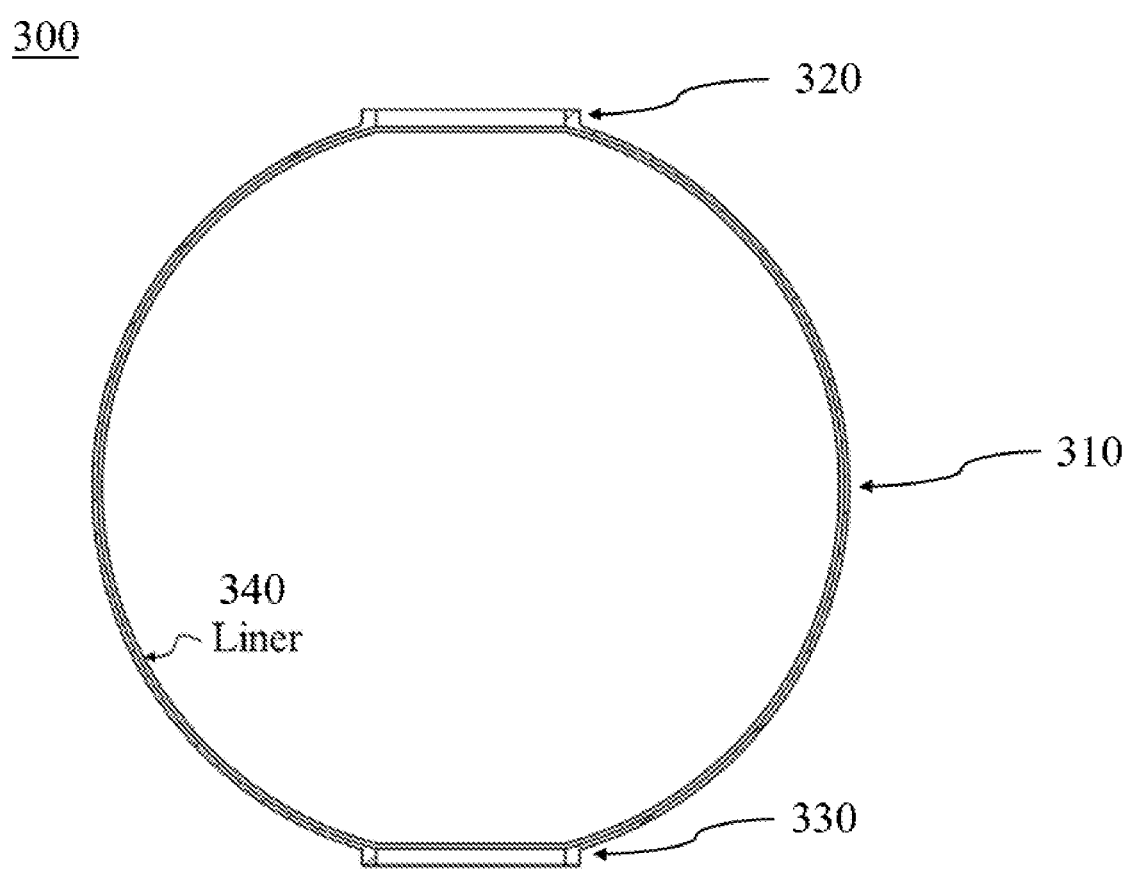

BULK METALLIC GLASS PRESSURE VESSELS

CROSS-REFERENCE TO RELATED APPLICATIONS

This application claims the benefit of Provisional U.S. Patent Application No. 62/919,675, filed Mar. 22, 2019, the entire disclosure of which is herein incorporated by reference.

BACKGROUND OF THE INVENTION

Pressure vessels are containers engineered to hold liquids or gases at a pressure different from the ambient pressure at ambient, elevated, or cryogenic temperatures, as described in, for instance, U.S. Pat. Nos. 3,319,420A, 3,140,006A, and 6,708,502B1. They can take various sizes and shapes and can be made of a wide range of materials. Pressure vessels are used widely in space, aerospace, and various other military and commercial applications. To satisfy the purpose of a pressure vessel, it needs to be capable of: i) storing fluids or gases under high pressure for a long period of time while being impermeable to the fluids stored within; ii) exhibiting high strength and burst strength and/or being able to sustain repeated cycles of pressurization and depressurization; iii) having lightweight; and iv) being easy to manufacture.

Out of the various criteria, lightweight and high strength are the most important factors to consider for the design of pressure vessels and especially for satellite tanks in most applications. The standard thin wall and spherical shape geometries are optimized to accommodate for such criteria. To avoid fractures of pressure vessels, the requirement for a factor of safety for pressure vessels is very high, ranging from 3-6, depending on the specific application. Chattopadhyay, S. (2004), Pressure Vessels: Design and Practice, CRC Press. (p. 10-11 and 24-25). Due to these constraints, pressure vessels are generally fabricated from steel, titanium, and aluminum, as they exhibit the requisite material properties. Although these metals can be machined into various geometries, hollow, thin wall shapes are challenging to achieve, and therefore, pressure vessels are conventionally fabricated by welding of multiple metal pieces.

The failure of pressure vessels is often responsible predominantly by the internal stress concentration, taken place in the forms of imperfections and welding joints, and variation in material properties originating from the fabrication methods. This is a major limitation when typical structure materials in a crystalline form are used, which are generally fabricated by welding of multiple metal pieces. Instances where pressure vessels catastrophically failed due to the above reasons have been known in the art. Prior attempts to address this problem, for instance, improving weld joining methods like explosive bonding and deposit welding and integrating liner or overwrap materials to the pressure vessel were complicated and almost impractical. In some instances, pressure vessels are made from non-metal thermoplastics such as polymers. Although the non-metal thermoplastics can be fabricated through techniques like injection molding and rotational molding into complicated shapes, these thermoplastics pressure vessels are not as strong as pressure vessels made from metals which limits the versatility in its applications.

Bulk metallic glasses (BMG) used in the present invention, also known as amorphous metals, are a class of materials that are characterized by their disordered atomic structure, as opposed to an ordered, crystalline atomic structure. Due to their unique structure, they exhibit various desirable properties such as lightweight, high strength, corrosion-resistant, and most importantly, the ability to be shaped into highly complex shapes through techniques like thermoplastic forming, blow molding, extrusion, shearing, soldering, and over-casting and over-molding. The present inventors have found that BMG pressure vessels, especially ones that are thermoplastically molded, can achieve a burst pressure that is not only significantly higher but also consistent. This means that the variation in burst pressure is very low as compared to crystalline materials, allowing to operate these pressure vessels at a pressure much closer to the yield stress limit, which translates into a lower required factor of safety. The present inventors contribute these high-quality properties to the drastic reduction and in some cases elimination of stress concentrations in the BMG pressure vessels during the thermoplastic forming process of the present invention as well. The thermoplastic forming methods of the present invention also allow BMG feedstocks to be shaped seamlessly into a pressure vessel in a single process, free of welds and joints that serve as failure points. The present inventors also produced a BMG pressure vessel having multiple parts, each of which is seamless or free of a welded joint.

In addition, the homogeneous and isotropic characteristics of the BMG pressure vessels of the present invention yield high strength and superior corrosion-resistant properties.

SUMMARY OF THE INVENTION

The pressure vessel of the present invention may comprise a main body with at least one opening. The pressure vessel may comprise an additional part such as a neck, a liner, a rib, a lattice, a fin, and a diaphragm. The pressure vessel may be free of a welded joint in entirety. The pressure vessel may contain multiple parts in the main body, each of which is free of a welded joint.

The pressure vessel may comprise a main body having at least one opening, wherein the main body is made from a BMG material, and wherein the pressure vessel is capable of receiving a pressurized fluid or gas.

The internal stresses within the pressure vessel may be less than 20% of the yield strength. The pressure vessel may have an inherent ductile state greater than the critical fictive temperature ($T_f > T_f^c$). The pressure vessel may have a crystallinity less than 10%. The pressure vessel may have a Young's modulus greater than 10 GPa and a yield strength greater than 1200 MPa. The pressure vessel may have one or more rotational symmetry along a single axis.

The pressure vessel may have a spherical shape with a ratio of a diameter to a corresponding wall thickness between 10 and 10,000.

The pressure vessel may have a cylindrical shape with a length-to-width ratio between 0.5 and 30. The pressure vessel may have a shape other than a spherical shape and a cylindrical shape.

The pressure vessel may have the thinnest part and the thickest part, wherein the thickness of the thinnest part is no more than ⅓ of the thickness of the thickest part.

The wall thickness of the pressure vessel may be non-uniform or uniform.

The pressure vessel may comprise a rib, a lattice, and/or a fin structure on an outside surface of the main body to enhance a burst strength of the pressure vessel and/or to reduce the overall weight of the pressure vessel.

The pressure vessel may be configured to act as a support for an insert which is in contact with a pressurized medium.

The pressure vessel may be a satellite tank; an aircraft tank; a satellite tank, further comprising a diaphragm; a fuel tank for automobiles and aircrafts; a gas tank for vehicles including automobiles and aircrafts; a submarine vessel; or a pressure chemical reactor vessel.

The pressure vessel may have an exterior design that resembles the overall geometry of a satellite to utilize the open space of the satellite.

The pressure vessel may be made through thermoplastic forming (TPF). The TPF may be performed below 700° C. The TPF may comprise steps of: providing separately a mold with a cavity and a BMG feedstock; heating the mold and placing the BMG feedstock into the mold; deforming the BMG feedstock at a processing temperature to replicate the shape of the cavity by applying a pressure; cooling the BMG feedstock to form a pressure vessel; and removing the pressure vessel from the mold.

BRIEF DESCRIPTION OF THE DRAWINGS

FIG. 3 shows a sketch of the cross-sectional view of a BMG pressure vessel according to the present invention with a thin wall liner on the inner surface of the pressure vessel.

DETAILED DESCRIPTION OF THE INVENTION

This invention relates to BMG pressure vessels, comprising a main body with at least one opening. The BMG pressure vessel may comprise an additional part such as a neck, a liner, a rib, a lattice, a fin, and a diaphragm. The BMG pressure vessel may be a one-piece, free of a welded joint in entirety. The BMG pressure vessel may contain multiple parts in the main body, each of which is free of a welded joint.

The BMG pressure vessel may be produced through the thermoplastic forming (TPF) process. The BMG pressure vessel may be a hollow walled vessel, essentially free of a welded joint in contrast to a conventional metal pressure vessel which contains a welded joint with the weld area that is comparable to the circumference of the pressure vessel. The BMG pressure vessel of present invention has one or more openings and can contain pressurized fluid or gas. The BMG pressure vessel can be formed through a TPF process in the BMG's supercooled liquid state, and, as a result, the BMG pressure vessel has a crystallinity of less than 10%. It has been known in the art that a material with crystallinity exceeding 10% suffers from properties deterioration, especially mechanically. Ketkaew, J., Liu, Z., Chen, W., & Schroers, J. (2015), Critical Crystallization for Embrittlement in *Metallic Glasses, Physical Review Letters,* 115(26), 265502 (Ketkaew et al., 2015). A critical capability offered by the present invention is that the TPF-based BMG pressure vessel is completely or essentially seamless and stress-free, has a uniform and consistent properties, and has a homogeneous glass state throughout the entire piece.

Figure 1A:
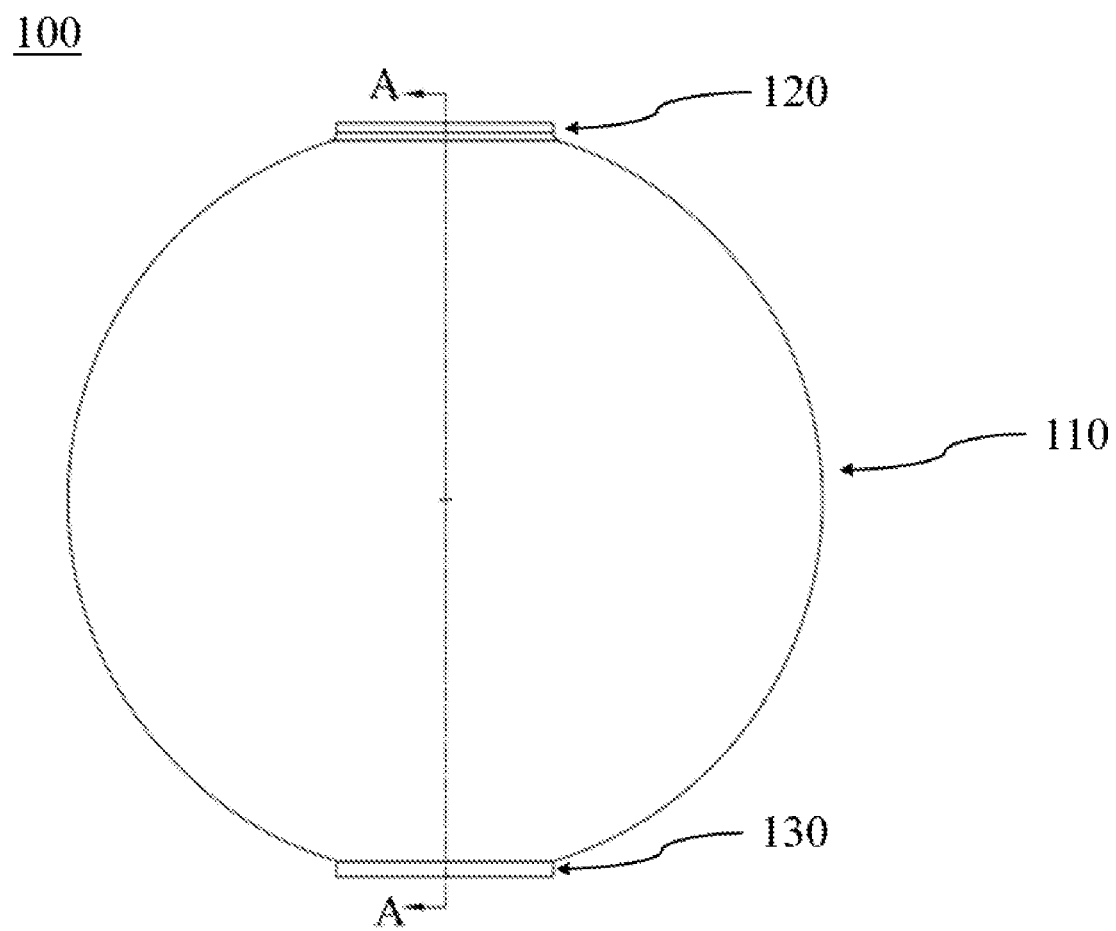
FIGS. 1A and 1B show a sketch of a BMG pressure vessel according to the present invention and a cross-sectional view of FIG. 1A through line A-A, respectively, that is spherical.
Figure 1B:
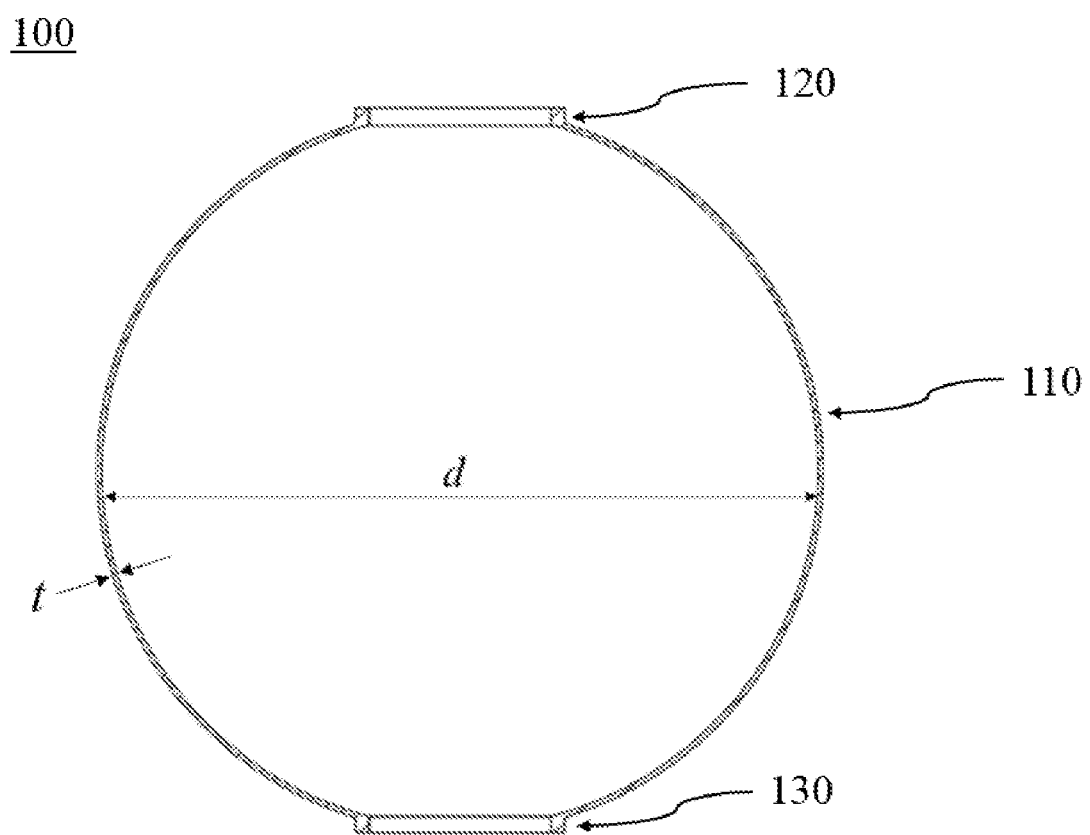

FIG. 1A and 1B show a BMG pressure vessel 100 of the present invention. The BMG pressure vessel has the geometrical shape of a sphere with two openings, comprising a main body 110 with the openings, an upper neck 120, and a lower neck 130. FIG. 1B depicts a cross-sectional view of FIG. 1A through line A-A with d as a diameter and t as a wall thickness of the pressure vessel. The pressure vessel may have only one opening. A ratio of the diameter (d) of the sphere to the corresponding wall thickness (t) is between 10 and 10,000. The BMG pressure vessel may contain none of the necks.

Figure 2A:
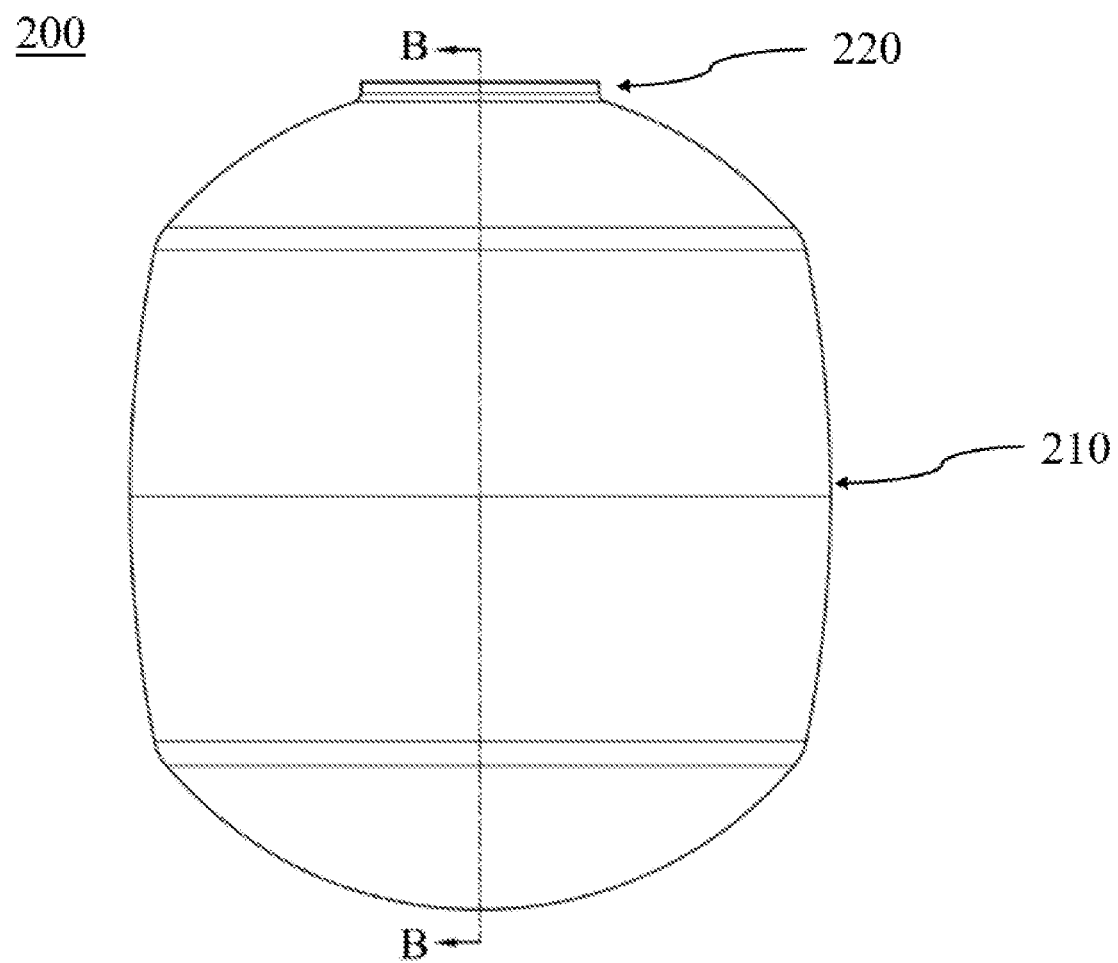
FIGS. 2A and 2B show a sketch of a BMG pressure vessel according to the present invention and a cross-sectional view of FIG. 2A through line B-B, respectively, that is non-spherical.
Figure 2B:
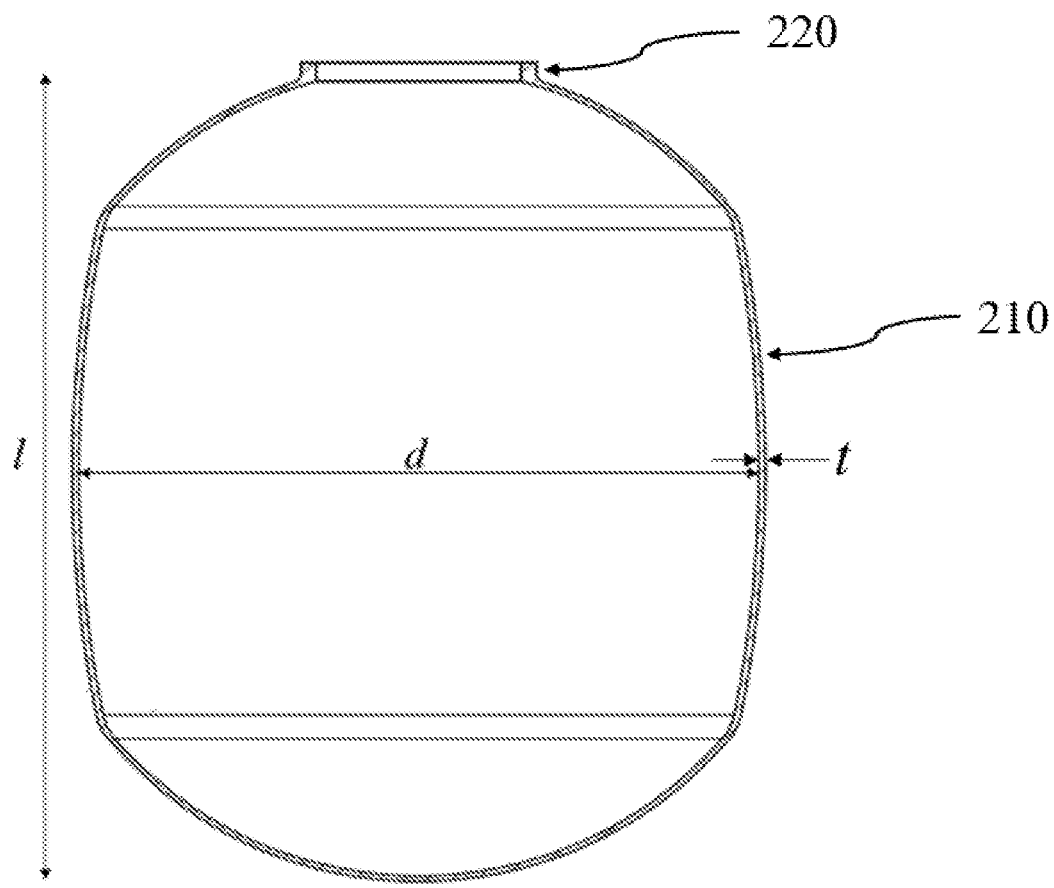

FIGS. 2A and 2B shows a BMG pressure vessel 200 of the present invention. The BMG pressure vessel has the shape of a cylindrical with one opening, comprising a main body 210 with the opening and an upper neck 220. FIG. 2B depicts a cross-sectional view of FIG. 2A with l as a length from the topmost to the bottommost of the pressure vessel in the vertical direction, d as a longest diameter in the horizontal direction, and t as a wall thickness of the pressure vessel. A ratio of the length (l) to the diameter (d) is between 0.5 and 30. The BMG pressure vessel may contain none of the neck.

FIG. 3 shows a sketch of the cross-sectional view of a BMG pressure vessel 300 of the present invention, comprising a main body 310, an upper neck 320, and a lower neck 330. The pressure vessel 300 further contains a thin wall liner 340 on the inner surface of the main body. The liner may be made of a BMG material or a non-BMG material such as a polymer. The liner may structurally support the main body and/or the necks. The liner may also prevent corrosion. The liner may be a hollow, thin-walled container that functions inside of the main body. The liner has a wall thickness less than that of the main body. The liner may be made under the same condition as that of the main body. A liner may be installed in any of the pressure vessels of the present invention.

Figure 4:
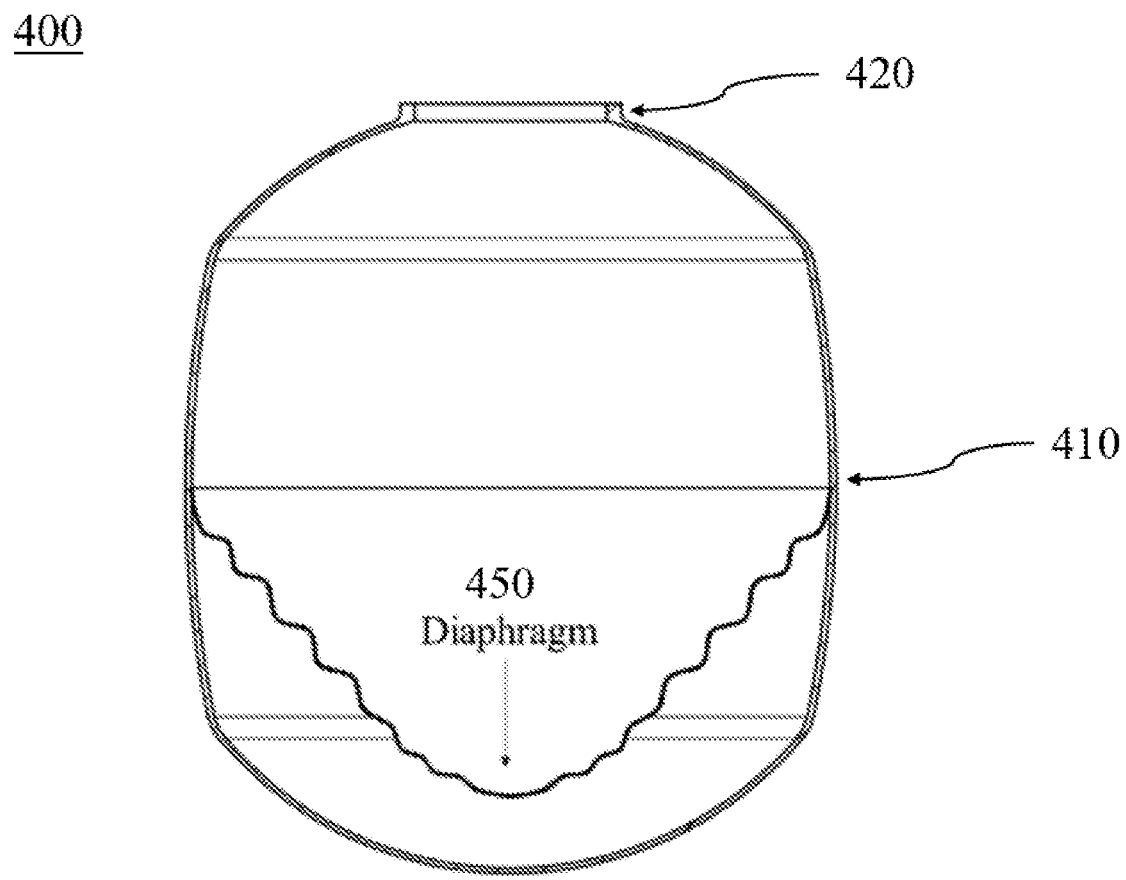
FIG. 4 shows a sketch of the cross-sectional view of a BMG pressure vessel according to the present invention with a diaphragm operating within the pressure vessel.

FIG. 4 shows a sketch of the cross-sectional view of a BMG pressure vessel 400 of the present invention, comprising a main body 410 and an upper neck 420. The pressure vessel 400 further contains a diaphragm 450 inside the main body.

The diaphragm may be made from a set of BMG layer/diaphragm layer/BMG layer. The diaphragm operates under the elastic strain region where the material exhibits a strain of less than 2%. The diaphragm layer may be made of a BMG material. A diaphragm may be installed in any of the pressure vessels of the present invention.

The crystallinity of the diaphragm may be less than 10%. The diaphragm may have a Youngs modulus greater than 10 GPa, an elasticity greater than 1%, and a yield strength greater than 1200 MPa. The diaphragm may be capable of deforming elastically. The diaphragm may operate under the elastic strain region where the material exhibits a strain of less than 2%. The diaphragm may have an inherent ductile state greater than the critical fictive temperature ($T_f > T_f^c$). The diaphragm may be made through thermoplastic forming such as blow molding at a forming temperature below 700° C.

Figure 5:
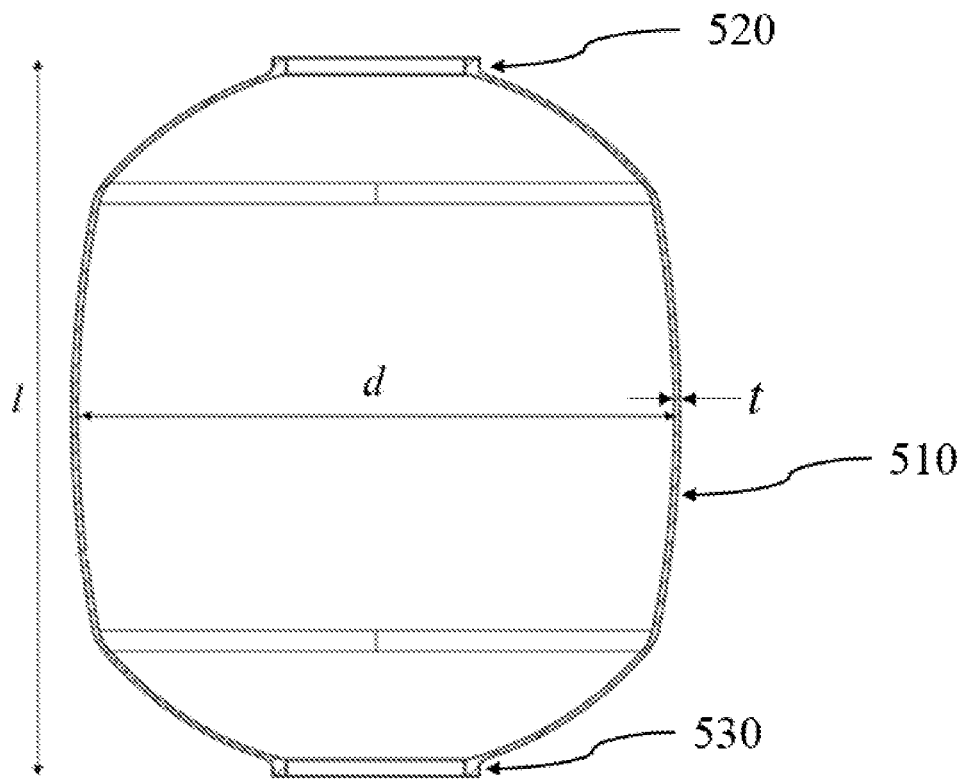
FIG. 5 shows a sketch of a cross-sectional view of a BMG pressure vessel according to the present invention that has a cylindrical shape.

FIG. 5 shows a sketch of a cross-sectional view of a BMG pressure vessel 500 of the present invention, comprising a main body 510, an upper neck 520, and a lower neck 530. The pressure vessel 500 has a cylindrical shape with d as a diameter, l as a length, and t as a wall thickness of the pressure vessel and has two openings as an inlet and an outlet.

Conventional pressure vessels are constructed by welding, brazing, rolling, or joining of various pieces of a rigid material, usually metals, that is compatible with the fluid to be stored. These resulting seams act as the weak point of the pressure vessel, including a stress concentration—act as a point of origin for fracture, source of leakages, for example, hydrogen or other gases. For instance, U.S. Pat. No. 3,140,006A discusses the leakage due to the diffusion of hydrogen through metallurgical bonds, such as those formed by welding, brazing, or rolling ad used to construct the pressure vessel. Previous inventions in the art attempt to address this issue by overwrapping or implementing an inner liner, made of metal and non-metal composites or polymers, onto the pressure vessel. U.S. Pat. No. 6,401,963B1. However, none of the prior art has demonstrated an essentially seamless, free of a joint pressure vessel that is the origin of the leakage and weak point of the pressure vessel, which is disclosed here in the present invention.

The BMG pressure vessels of the present invention may be completely or essentially seamless, free of a welded joint. The BMG pressure vessel may be free of a welded joint in entirety. A main body may be welded to at least one neck. The main body and the at least one neck may be formed in a single forming step. The BMG pressure vessel may comprise or consist of multiple parts in the main body, each of which is free of a welded joint. A ratio of the diameter to the corresponding wall thickness may be between 10 and 10,000.

Figure 6:
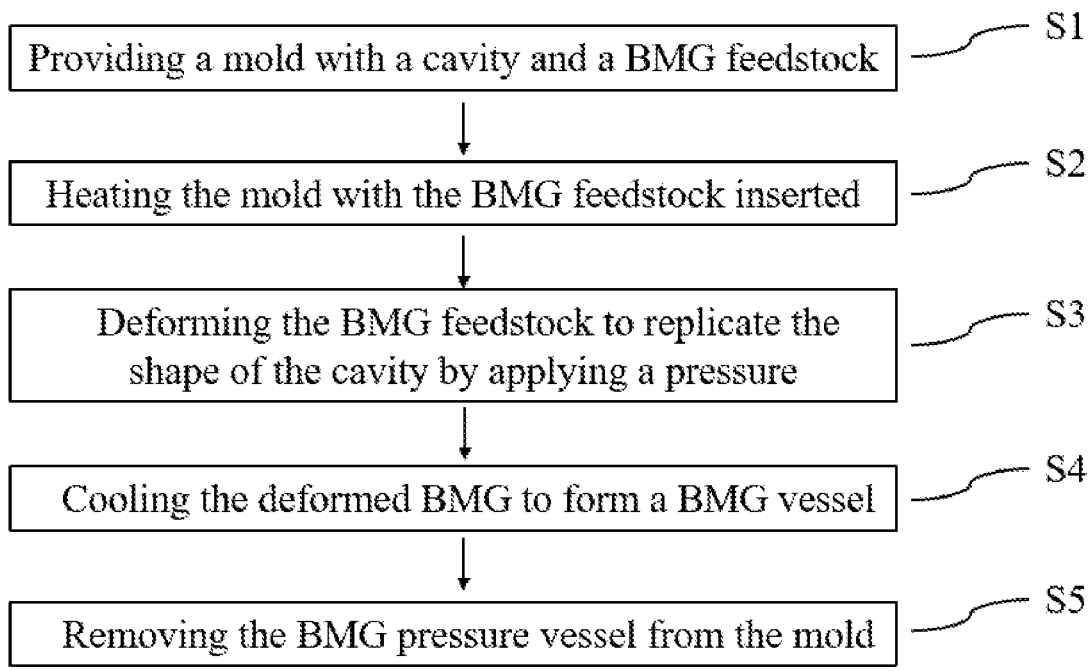
FIG. 6 shows a flowchart describing one example of the TPF method of forming the BMG pressure vessels of the present invention.

Referring to FIG. 6, one example of forming the BMG pressure vessels of the present invention, thermoplastic forming (TPF), is described in a flowchart.

In the step S1, a mold with a cavity and a BMG feedstock are separately provided. The shape of the cavity is selected according to the shape of the pressure vessel to be formed. The mold may be made of one or more of various materials such as brass, steel, stainless steel, and non-metal such as alumina.

In the step S2, the mold is heated up to a processing temperature which is in a supercooled liquid region between the glass transition temperature and the crystallization temperature of the BMG feedstock. The BMG feedstock is placed into the mold cavity, covering the opening of the mold cavity, before or after the mold temperature reaches the processing temperature.

In the step S3, after the temperature of the BMG feedstock reaches the processing temperature, which allows the BMG feedstock to become viscous and moldable, a pressure is applied to the BMG feedstock such that the BMG feedstock deforms toward the surface of the cavity. The BMG feedstock deforms until reaching the surface of the cavity and replicating the shape of the cavity. The duration of deforming the BMG feedstock, the processing temperature, and the applied pressure are pre-determined to control the thickness, the crystallinity, and other properties of the BMG pressure vessel to be formed. The applied pressure is selected to be larger than the flow stress of the BMG feedstock. The deformation duration is selected to be shorter than the amount of time that causes substantial crystallization such that the crystallinity of the BMG pressure vessel to be formed is minimized to be less than 10%.

In the step S4, once the BMG feedstock completely fills the cavity of the mold, the deformed BMG is cooled below its glass transition temperature to form a BMG pressure vessel.

In the step S5, the BMG pressure vessel is removed from the mold.

The above-descried method is one example of the methods of forming the BMG pressure vessels of the present invention.

In one embodiment, the processing temperature may be below 700° C., where the cooling rate variation within the pressure vessel is small, for example, less than 100K/s, and as a result of such small variation, the internal stresses within the pressure vessel are less than 10% of the yield strength in all locations within the pressure vessel, and the magnitude of the cooling rate warrants that the inherent ductile state, defined by the fictive temperature, is greater than the critical fictive temperature ($T_f > T_f^c$) as defined and explained by Ketkaew et al., Ketkaew, et al., 2018, Mechanical glass transition revealed by the fracture toughness of metallic glasses, *Nature Communications*, 9(1), 1-7 (Ketkaew et al., 2018).

Furthermore, as additional consequences of the TPF process, the BMG pressure vessel has Young's modulus greater than 10 GPa and a yield strength greater than 1200 MPa, and the internal stress is reduced dramatically.

The BMG pressure vessels disclosed in the present invention may be made out of one or more of seamless pieces to form a seamless or essentially seamless vessel. Each of the multiple seamless pieces may be formed by a method similar to the above-described method. It is extremely challenging to create parts where the wall thickness is significantly smaller than the other dimensions, such as the diameter. Such structural characteristics of a pressure vessel can be achieved by the method of the present invention.

Embodiments of the present invention are not limited to a particular BMG composition. Any suitable BMG alloy composition can be utilized to form the BMG pressure vessel. A suitable alloy composition has one of the following constituent elements as a base element: Zr, Ti, Ni, Pd, Mg, Al, La, Ce, Fe, Pt, Nb, Ir, Mo, W, Cu, Au, Ag, Hf, Co, Gd, Be, B, C, P, Si, Rh, and a mixture thereof. For another example, a suitable BMG alloy composition is one of $Zr_{44}Ti_{11}Cu_{10}Ni_{10}Be_{25}$, $Zr_{41}Ti_{14}Cu_{12.5}Ni_{10}Be_{22.5}$, $Zr_{35}Ti_{30}Cu_{7.5}Be_{27.5}$, $Zr_{46}Cu_{46}Be_{8}$, $Zr_{57}Nb_{5}Cu_{15.4}Ni_{12.6}Al_{10}$, $Zr_{65}Al_{10}Ni_{10}Cu_{15}$, $Zr_{65}Al_{7.5}Ni_{10}Cu_{12.5}Ag_{5}$, $Zr_{66.4}Nb_{6.4}Cu_{10.5}Ni_{8.7}Al_{8}$, $Zr_{55}Cu_{30}Al_{10}Ni_{5}$, $Zr_{46}Cu_{46}Be_{8}$, $Ti_{41}Zr_{25}Be_{28}Fe_{6}$, $Ti_{45}Zr_{20}Be_{29}Fe_{6}$, $Ti_{35}Zr_{30}Be_{25}$, $Ti_{30}Zr_{35}Be_{25}$, $Ti_{40}Zr_{10}Cu_{34}Pd_{14}Sn_{2}$, $Ti_{40}Zr_{10}Cu_{32}Pd_{14}Sn_{4}$, $Pd_{43}Cu_{27}Ni_{10}P_{20}$, $Pd_{40}Ni_{10}Cu_{30}P_{20}$, $Pd_{40}Ni_{40}P_{20}$, $Pt_{57.5}Ni_{14.7}Cu_{5.3}P_{22.5}$, $Au_{49}Ag_{5.5}Pd_{2.3}Cu_{26.9}Si_{16.3}$, $Ni_{45}Pd_{35}P_{17}B_{3}$, $Ni_{45}Ti_{20}Zr_{25}Al_{10}$, $Ni_{40}Ti_{17}Zr_{28}Al_{10}Cu_{5}$, $Ni_{62}Pd_{19}Si_{2}P_{17}$, $Cu_{46}Zr_{42}Al_{7}Y_{5}$, $Mg_{65}Cu_{25}Y_{10}$, $Mg_{65}Cu_{7.5}Ni_{7.5}Zn_{5}Ag_{5}Y_{10}$, $La_{55}Al_{25}Co_{5}Cu_{10}Ni_{5}$, $Fe_{41}Co_{7}Cr_{15}Mo_{14}C_{15}B_{6}Y_{2}$ and a mixture thereof.

The BMG pressure vessels of the present invention has a lightweight with high strength and is corrosion resistant. The BMG pressure vessels, especially ones that are processed through the TPF process, exhibit consistently high strength with very little scatter burst strength throughout the pressure vessel structure. The drastic reduction of stress concentrations in the BMG pressure vessel eliminates or significantly reduces stresses. Surprisingly, the present inventors found that, when using metallic glasses that are thermoplastically molded, the burst pressure is not only significantly higher, but also the variation in burst pressure is very low as compared to crystalline materials, allowing to operate these pressure vessels at a pressure much closer to the yield stress limit which translates into a lower required factor of safety. The present inventors contribute this result to the fact that all stresses were reduced from the fabrication during the thermoplastic forming.

The TPF methods of the present invention allow a BMG feedstock to be shaped seamlessly into a pressure vessel in a single process, free of welds and joints that serve as failure points. Multiple BMG deformed through TPF may be separately shaped seamlessly to be placed into a pressure vessel. In addition, the homogeneous and isotropic characteristics of the BMG materials yield high strength and superior corrosion-resistant properties.

The invention claimed is:

1. A pressure vessel, the pressure vessel comprising:
a main body with at least one opening, wherein the main body is made from a BMG material, and wherein the pressure vessel is capable of receiving a pressurized fluid or gas.

2. The pressure vessel of claim 1, wherein the pressure vessel is made through thermoplastic forming such that the pressure vessel is seamless in entirety.

3. The pressure vessel of claim 2, wherein the thermoplastic forming temperature is below 700° C.

4. The pressure vessel of claim 1, wherein the internal stress within the pressure vessel is less than 20% of the material's yield strength.

5. The pressure vessel of claim 1, wherein the pressure vessel has an inherent ductile state greater than the critical fictive temperature ($T_f > T_f^c$).

6. The pressure vessel of claim 1, wherein the pressure vessel has a crystallinity less than 10%.

7. The pressure vessel of claim 1, wherein the pressure vessel has a Young's modulus greater than 10 GPa and a yield strength greater than 1200 MPa.

8. The pressure vessel of claim 1, wherein the pressure vessel has one or more rotational symmetry along a single axis.

9. The pressure vessel of claim 1, wherein the pressure vessel has a spherical shape and a ratio of a diameter of the spherical shape to a corresponding wall thickness of the main body is between 10 and 10,000.

10. The pressure vessel of claim 1, wherein the pressure vessel has a cylindrical shape with a length-to-width ratio between 0.5 and 30.

11. The pressure vessel of claim 1, wherein the main body has the thinnest part and the thickest part, wherein the thickness of the thinnest part is no more than a ⅓ of the thickness of the thickest part.

12. The pressure vessel of claim 1, wherein the wall thickness of the main body is non-uniform.

13. The pressure vessel of claim 1, wherein the wall thickness of the main body is uniform.

14. The pressure vessel of claim 1, wherein the pressure vessel further comprises a rib, a lattice, and/or a fin structure on an outside surface of the main body to enhance a burst strength of the pressure vessel and/or to reduce the overall weight of the pressure vessel.

15. The pressure vessel of claim 1, wherein the pressure vessel has a thin wall thickness such that a supporting outside shell is required to withstand the pressure.

16. The pressure vessel of claim 1, wherein the pressure vessel is configured to act as a support for an insert which is in contact with a pressurized medium.

17. The pressure vessel of claim 1, wherein the pressure vessel is a satellite tank.

18. The pressure vessel of claim 1, wherein the pressure vessel is an aircraft tank.

19. The pressure vessel of claim 1, wherein the pressure vessel is a satellite tank and further comprises a diaphragm.

20. The pressure vessel of claim 17, wherein the pressure vessel has an exterior design that resembles the overall geometry of the satellite to utilize an open space of the satellite.

21. The pressure vessel of claim 1, wherein the pressure vessel is a fuel tank for vehicles including automobiles or aircrafts.

22. The pressure vessel of claim 1, wherein the pressure vessel is a gas tank for vehicles including automobiles or aircrafts.

23. The pressure vessel of claim 1, wherein the pressure vessel is a submarine vessel.

24. The pressure vessel of claim 1, wherein the pressure vessel is a pressure chemical reactor vessel.

25. The pressure vessel of claim 1, wherein the BMG material comprises, as a constituent element, one or more of: Zr, Ti, Ni, Pd, Mg, Al, La, Ce, Fe, Pt, Nb, Ir, Mo, W, Cu, Au, Ag, Hf, Co, Gd, Be, B, C, P, Si, and Rh.

26. The pressure vessel of claim 1, wherein the BMG material is one of:
$Zr_{44}Ti_{11}Cu_{10}Ni_{10}Be_{25}$, $Zr_{41}Ti_{14}Cu_{12.5}Ni_{10}Be_{22.5}$, $Zr_{35}Ti_{30}Cu_{7.5}Be_{27.5}$, $Zr_{46}Cu_{46}Be_{8}$, $Zr_{57}Nb_{5}Cu_{15.4}Ni_{12.6}Al_{10}$, $Zr_{65}Al_{10}Ni_{10}Cu_{15}$, $Zr_{65}Al_{7.5}Ni_{10}Cu_{12.5}Ag_{5}$, $Zr_{66.4}Nb_{6.4}Cu_{10.5}Ni_{8.7}Al_{8}$, $Zr_{55}Cu_{30}Al_{10}Ni_{5}$, $Zr_{46}Cu_{46}Be_{8}$, $Ti_{41}Zr_{25}Be_{28}Fe_{6}$, $Ti_{45}Zr_{20}Be_{29}Fe_{6}$, $Ti_{35}Zr_{30}Be_{25}$, $Ti_{30}Zr_{35}Be_{25}$, $Ti_{40}Zr_{10}Cu_{34}Pd_{14}Sn_{2}$, $Ti_{40}Zr_{10}Cu_{32}Pd_{14}Sn_{4}$, $Pd_{43}Cu_{27}Ni_{10}P_{20}$, $Pd_{40}Ni_{10}Cu_{30}P_{20}$, $Pd_{40}Ni_{40}P_{20}$, $Pt_{57.5}Ni_{14.7}Cu_{5.3}P_{22.5}$, $Au_{49}Ag_{5.5}Pd_{2.3}Cu_{26.9}Si_{16.3}$, $Ni_{45}Pd_{35}P_{17}B_{3}$, $Ni_{45}Ti_{20}Zr_{25}Al_{10}$, $Ni_{40}Ti_{17}Zr_{28}Al_{10}Cu_{5}$, $Ni_{62}Pd_{19}Si_{2}P_{17}$, $Cu_{46}Zr_{42}Al_{7}Y_{5}$, $Mg_{65}Cu_{25}Y_{10}$, $Mg_{65}Cu_{7.5}Ni_{7.5}Zn_{5}Ag_{5}Y_{10}$, $La_{55}Al_{25}Co_{5}Cu_{10}Ni_{5}$, $Fe_{41}Co_{7}Cr_{15}Mo_{14}C_{15}B_{6}Y_{2}$, and a mixture thereof.

27. A diaphragm, wherein the diaphragm is made of a BMG material, and wherein the diaphragm is capable of operating in a pressure vessel.

28. The diaphragm of claim 27, wherein the crystallinity of the diaphragm is less than 10%.

29. The diaphragm of claim 27, wherein the diaphragm has a Young's modulus greater than 10 GPa, an elasticity greater than 1%, and a yield strength greater than 1200 MPa.

30. The diaphragm of claim 27, wherein the diaphragm is capable of deforming elastically.

31. The diaphragm of claim 27, wherein the diaphragm is made through thermoplastic forming at a forming temperature below 700° C.

32. The diaphragm of claim 27, wherein the diaphragm operates under the elastic strain region where the material exhibits a strain of less than 2%.

33. The diaphragm of claim 27, wherein the diaphragm has an inherent ductile state greater than the critical fictive temperature ($T_f > T_f^c$).

34. The diaphragm of claim 27, wherein the inherent ductile state of the diaphragm ($T_f > T_f^c$) of the glass is realized.

35. The diaphragm of claim 27, wherein the BMG material comprises, as a constituent element, one or more of: Zr, Ti, Ni, Pd, Mg, Al, La, Ce, Fe, Pt, Nb, Ir, Mo, W, Cu, Au, Ag, Hf, Co, Gd, Be, B, C, P, Si and Rh.

36. The diaphragm of claim 27, wherein the BMG material is one of: $Zr_{44}Ti_{11}Cu_{10}Ni_{10}Be_{25}$, $Zr_{41}Ti_{14}Cu_{12.5}Ni_{10}Be_{22.5}$, $Zr_{35}Ti_{30}Cu_{7.5}Be_{27.5}$, $Zr_{46}Cu_{46}Be_8$, $Zr_{57}Nb_5Cu_{15.4}Ni_{12.6}Al_{10}$, $Zr_{65}Al_{10}Ni_{10}Cu_{15}$, $Zr_{65}Al_{7.5}Ni_{10}Cu_{12.5}Ag_5$, $Zr_{66.4}Nb_{6.4}Cu_{10.5}Ni_{8.7}Al_8$, $Zr_{55}Cu_{30}Al_{10}Ni_5$, $Zr_{46}Cu_{46}Be_8$, $Ti_{41}Zr_{25}Be_{28}Fe_6$, $Ti_{45}Zr_{20}Be_{29}Fe_6$, $Ti_{35}Zr_{30}Be_{25}$, $Ti_{30}Zr_{35}Be_{25}$, $Ti_{40}Zr_{10}Cu_{34}Pd_{14}Sn_2$, $Ti_{40}Zr_{10}Cu_{32}Pd_{14}Sn_4$, $Pd_{43}Cu_{27}Ni_{10}P_{20}$, $Pd_{40}Ni_{10}Cu_{30}P_{20}$, $Pd_{40}Ni_{40}P_{20}$, $Pt_{57.5}Ni_{14.7}Cu_{5.3}P_{22.5}$, $Au_{49}Ag_{5.5}Pd_{2.3}Cu_{26.9}Si_{16.3}$, $Ni_{45}Pd_{35}P_{17}B_3$, $Ni_{45}Ti_{20}Zr_{25}Al_{10}$, $Ni_{40}Ti_{17}Zr_{28}Al_{10}Cu_5$, $Ni_{62}Pd_{19}Si_2P_{17}$, $Cu_{46}Zr_{42}Al_7Y_5$, $Mg_{65}Cu_{25}Y_{10}$, $Mg_{65}Cu_{7.5}Ni_{7.5}Zn_5Ag_5Y_{10}$, $La_{55}Al_{25}Co_5Cu_{10}Ni_5$, $Fe_{41}Co_7Cr_{15}Mo_{14}C_{15}B_6Y_2$, and a mixture thereof.

\* \* \* \* \*